United States Patent
Chen et al.

(10) Patent No.: US 8,451,884 B2
(45) Date of Patent: May 28, 2013

(54) OFFSET CALIBRATION METHODS AND RADIO FREQUENCY DATA PATH CIRCUITS

(75) Inventors: Chien-Ming Chen, Hsinchu (TW); Chih-Chien Huang, Yunlin Hsien (TW); Shang-Yi Lin, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 1446 days.

(21) Appl. No.: 12/034,679

(22) Filed: Feb. 21, 2008

(65) Prior Publication Data

US 2008/0285639 A1  Nov. 20, 2008

Related U.S. Application Data

(60) Provisional application No. 60/938,465, filed on May 17, 2007.

(51) Int. Cl.
*H03H 7/30* (2006.01)

(52) U.S. Cl.
USPC ........... 375/232; 375/229; 375/230; 375/231; 375/345; 375/350; 330/304

(58) Field of Classification Search
USPC ........... 375/231–233, 224, 229, 346; 330/254
See application file for complete search history.

(56) References Cited

U.S. PATENT DOCUMENTS

| | | | | |
|---|---|---|---|---|
| 7,826,522 B2 * | 11/2010 | Sumesaglam | ................. | 375/229 |
| 8,335,249 B1 * | 12/2012 | Su et al. | ........................ | 375/232 |
| 2003/0030491 A1 * | 2/2003 | Hart | ............................. | 330/254 |
| 2006/0045176 A1 * | 3/2006 | Moughabghab et al. | ..... | 375/232 |
| 2006/0067440 A1 * | 3/2006 | Hsu et al. | ....................... | 375/345 |
| 2006/0240779 A1 | 10/2006 | Rostami et al. | | |

* cited by examiner

*Primary Examiner* — Daniel Washburn
*Assistant Examiner* — Eboni Hughes
(74) *Attorney, Agent, or Firm* — McClure, Qualey & Rodack, LLP

(57) ABSTRACT

An offset calibration method is provided. Two input terminals of an equalizer are switched to a common voltage at a first time point, wherein the equalizer generates a first equalized signal and a second equalized signal according to the common voltage. It is determined whether a first offset voltage is present in the equalizer according to the first and second equalized signals generated from the common voltage. If the first offset voltage is determined to be present in the equalizer, a first compensation voltage is provided to the equalizer.

18 Claims, 9 Drawing Sheets

US 8,451,884 B2

OFFSET CALIBRATION METHODS AND RADIO FREQUENCY DATA PATH CIRCUITS

CROSS REFERENCE TO RELATED APPLICATIONS

The present application claims the benefit of U.S. provisional application entitled "OFFSET CALIBRATION METHODS AND RADIO FREQUENCY DATA PATH CIRCUITS", Ser. No. 60/938,465 filed May 17, 2007.

BACKGROUND OF THE INVENTION

1. Field of the Invention

The invention relates to an offset calibration method, and more particularly to an offset calibration for a radio frequency (RF) data path circuit.

2. Description of the Related Art

FIG. 1 shows a conventional RF data path circuit. As shown in FIG. 1, the RF data path circuit 1 comprises a variable-gain amplifier (VGA) 10, an equalizer 11, and an analog-to-digital converter (ADC) 12. The VGA 10 receives a signal RFIP, which is the sum of data signals A, B, C, and D from a pickup head, and a reference signal. The VGA 10 generates and transmits signals VGP and VGN to the equalizer 11. The equalizer 11 generates signals VADP and VADN according to the signals VGP and VGN. The ADC 12 generates a logic code LC by comparing the signals VADP and VADN. The equalizer 11 is an offset-sensitive circuit. When an offset voltage is present in the signals VGP and VGN, the equalizer 11 is not able to properly equalize the signals VGP and VGN. Moreover, even though there is no offset voltage in the signals VGP and VGN, the ADC 12 may generate an incorrect logic code when an offset voltage is originally present in the equalizer 11.

FIGS. 2a and 2b respectively show the waveforms of the signals VGP and VGN and the signals VADP and VADN if no offset voltages are present in the VGA 10 and the equalizer 11. When no offset voltage is present in the VGA 10 and the equalizer 11, the signals VGP, VGN, VADP, and VADN have ideal waveforms. Zero-cress points and duty cycles of the signals VGP and VGN are identical to those of the signals VADP and VADN. Therefore, a point P2a where the levels of the signals VGP and VGN are close to each other corresponds to a point P2b where the levels of the signals VADP and VADN are close to each other without point shift. The ADC 12 can correctly generate the logic code LC presenting "0" corresponding to zero-cross points P2a and P2b of signals VGP, VGN, VADP, VADN, thus avoiding errors in data slicing level.

FIGS. 3a and 3b show the waveforms of the signals VGP and VGN and the signals VADP and VADN when an offset voltage is present in the equalizer 11. When an offset voltage is present in the equalizer 11, subsequent to transmission of the signals VGP and VGN with ideal waveforms to the equalizer 11, the zero-cross points and the duty cycles of the signals VGP and VGN are different from those of the signals VADP and VADN. Therefore, a point P3a where the levels of the signals VGP and VGN are close to each other does not correspond to a point P3b where the levels of the signals VADP and VADN are close to each other. Correct determination of the data slicing level for the signals VADP and VADN is thus not possible. Moreover, due to the DC offset voltage, the signals VGP and VGN and the signals VADP and VADN are greater than expected levels, and saturation portions of these signals may cut out, resulting in poor data reading quality.

An RF data path circuit eliminating the offset voltage and enhancing the quality of data reading for an optical recording apparatuses is desirable.

BRIEF SUMMARY OF THE INVENTION

The invention provides an offset calibration method. An exemplary embodiment of an offset calibration method comprises switching two input terminals of an equalizer to a common voltage at a first time point, wherein the equalizer generates a first equalized signal and a second equalized signal according to the common voltage. It is then determined a first offset voltage is present in the equalizer according to the first and second equalized signals generated from the common voltage. A first compensation voltage is provided to the equalizer if the first offset voltage is determined to be present in the equalizer.

The invention provides a radio frequency (RF) data path circuit. An exemplary embodiment of an RF data path circuit comprises an equalizer, a determination unit, and a first offset calibration unit. The equalizer comprises two input terminals and generates a first equalized signal and a second equalized signal. At a first time point, the two input terminals of the equalizer are switched to couple a common voltage. The determination unit determines whether a first offset voltage is present in the equalizer according to the first and second equalized signals of the first time point generated from the common voltage. The first offset calibration unit is coupled to the equalizer. The first offset calibration unit provides a first compensation voltage to the equalizer if the first offset voltage is determined to be present in the equalizer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
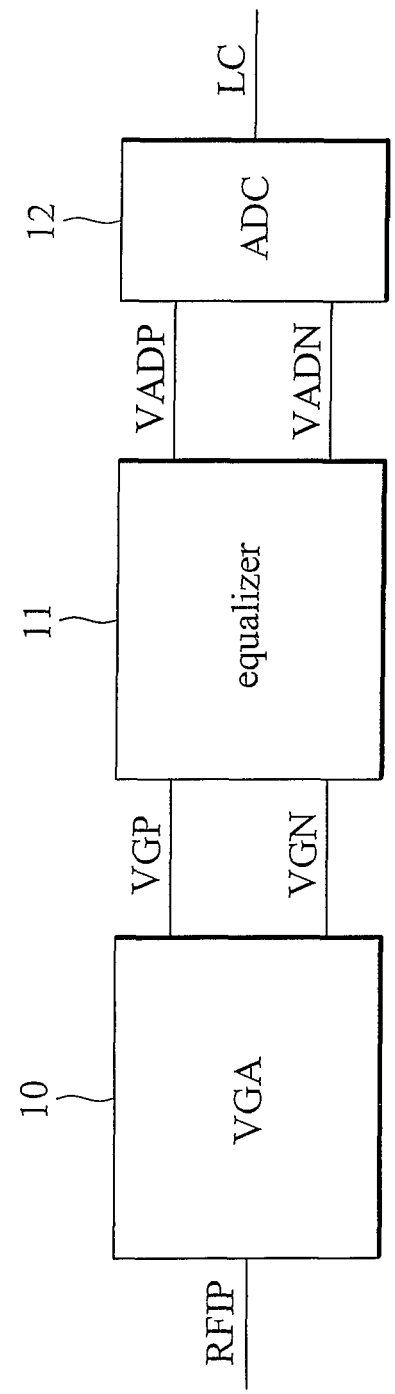
FIG. 1 shows a conventional RF data path circuit.
Figure 2A:
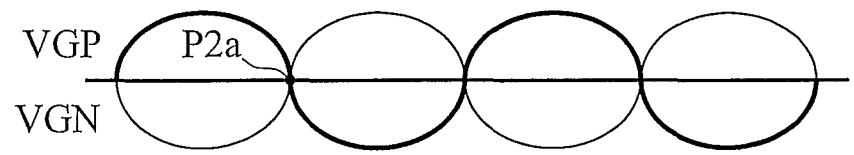
FIGS. 2a and 2b respectively show the waveforms of the signals VGP and VGN and the signals VADP and VADN if there is no offset voltage in the VGA 10 and the equalizer 11 in FIG. 1.
Figure 2B:
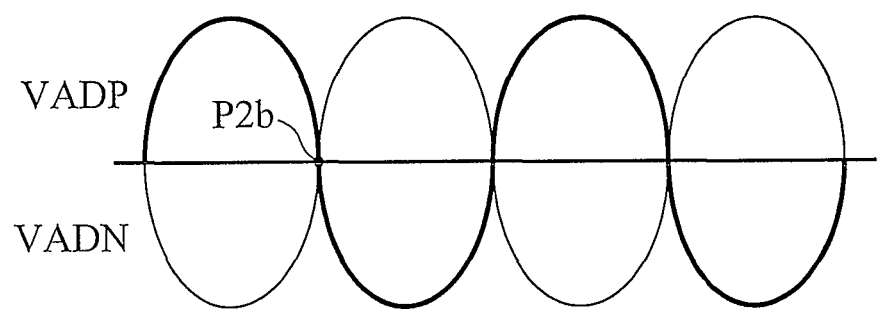
Figure 3A:
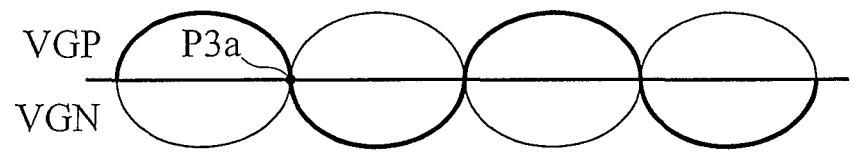
FIGS. 3a and 3b show the waveforms of the signals VGP and VGN and the signals VADP and VADN when an offset voltage is present in the equalizer 11 in FIG. 1.
Figure 3B:
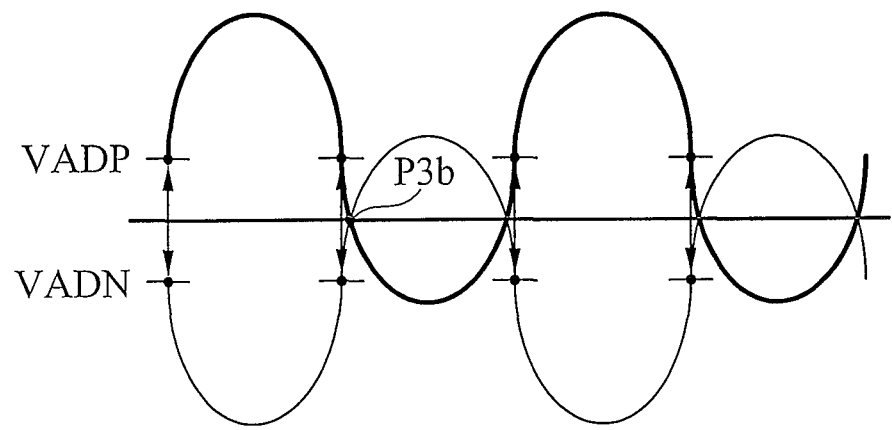

The following description is of the best-contemplated mode of carrying out the invention. This description is made for the purpose of illustrating the general principles of the invention and should not be taken in a limiting sense. The scope of the invention is best determined by reference to the appended claims.

Radio frequency (RF) data path circuits are provided. In an exemplary embodiment of an RF data path circuit shown in FIG. 4, an RF data path circuit 4 comprises an amplifier 40, an equalizer 41, an analog-to-digital converter (ADC) 42, an offset calibration unit 43, an offset calibration unit 44, and a determination unit 45. The amplifier 40, e.g. a VGA (variable gain amplifier), comprises at least one input terminal IN40 and two output terminals OUT40a and OUT40b. The at least one input terminal IN40 of the amplifier 40 receives an input signal RFIP, which may be the sum of data signals A, B, C, and D from a pickup head, or directly receives the data signal A, B, C, or D from the pickup head. In a normal mode, the amplifier 40 generates gained signals VGP and VGN according to the input signal RFIP. The amplifier 40 transmits the gained signals VGP and VGN to two input terminals IN41a and IN41b of the equalizer 41 through its two output terminals OUT40a and OUT40b, respectively. The equalizer 41 generates equalized signals VADP and VADN according to the gained signals VGP and VGN. The equalizer 41 transmits the equalized signals VADP and VADN to the ADC 42 respectively through two output terminals OUT41a and OUT41b. The ADC 42 receives the equalized signals VADP and VADN and generates a logic code LC accordingly.

Figure 4:
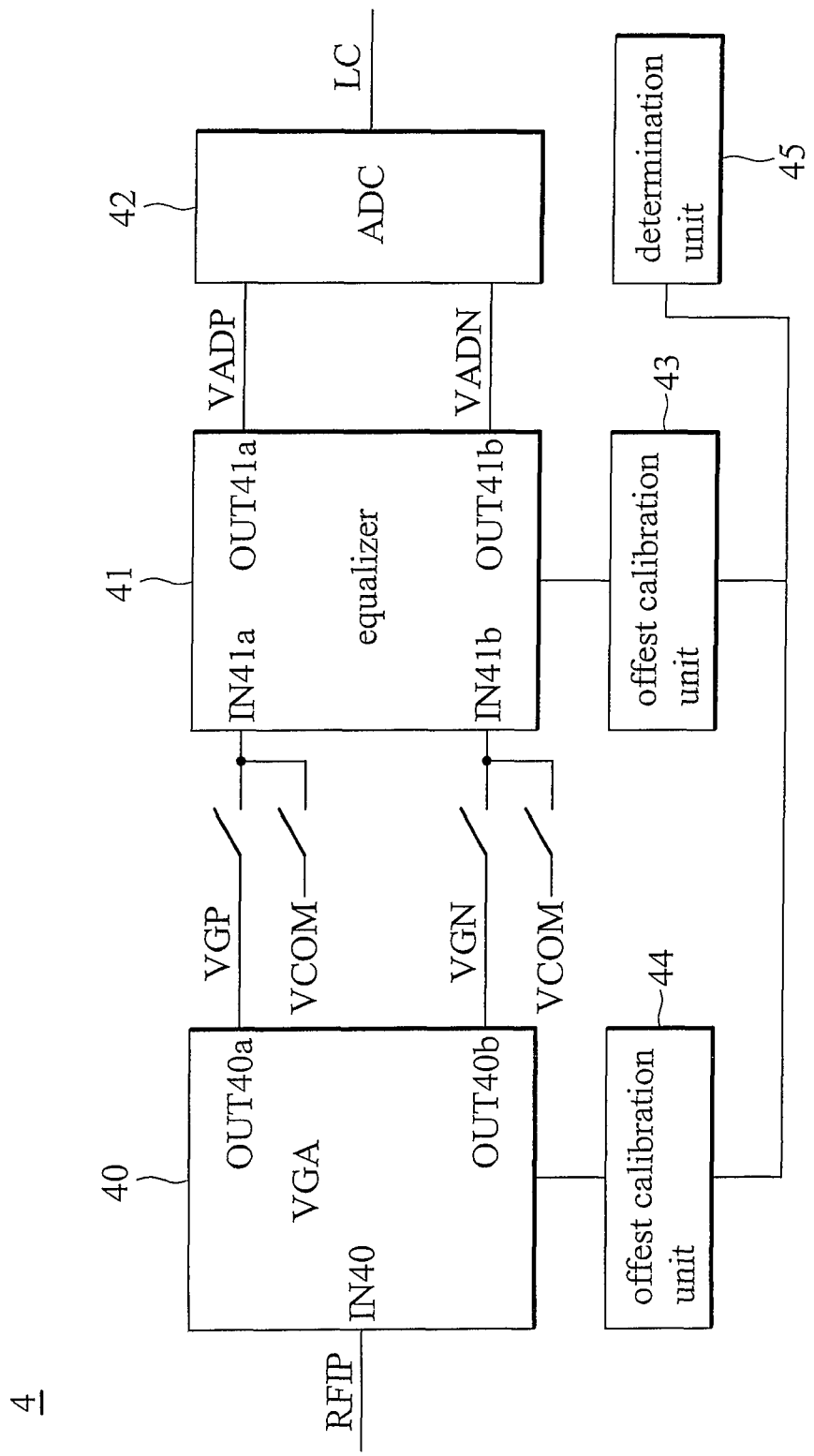
FIG. 4 shows an exemplary embodiment of an RF data path circuit.
Figure 5:
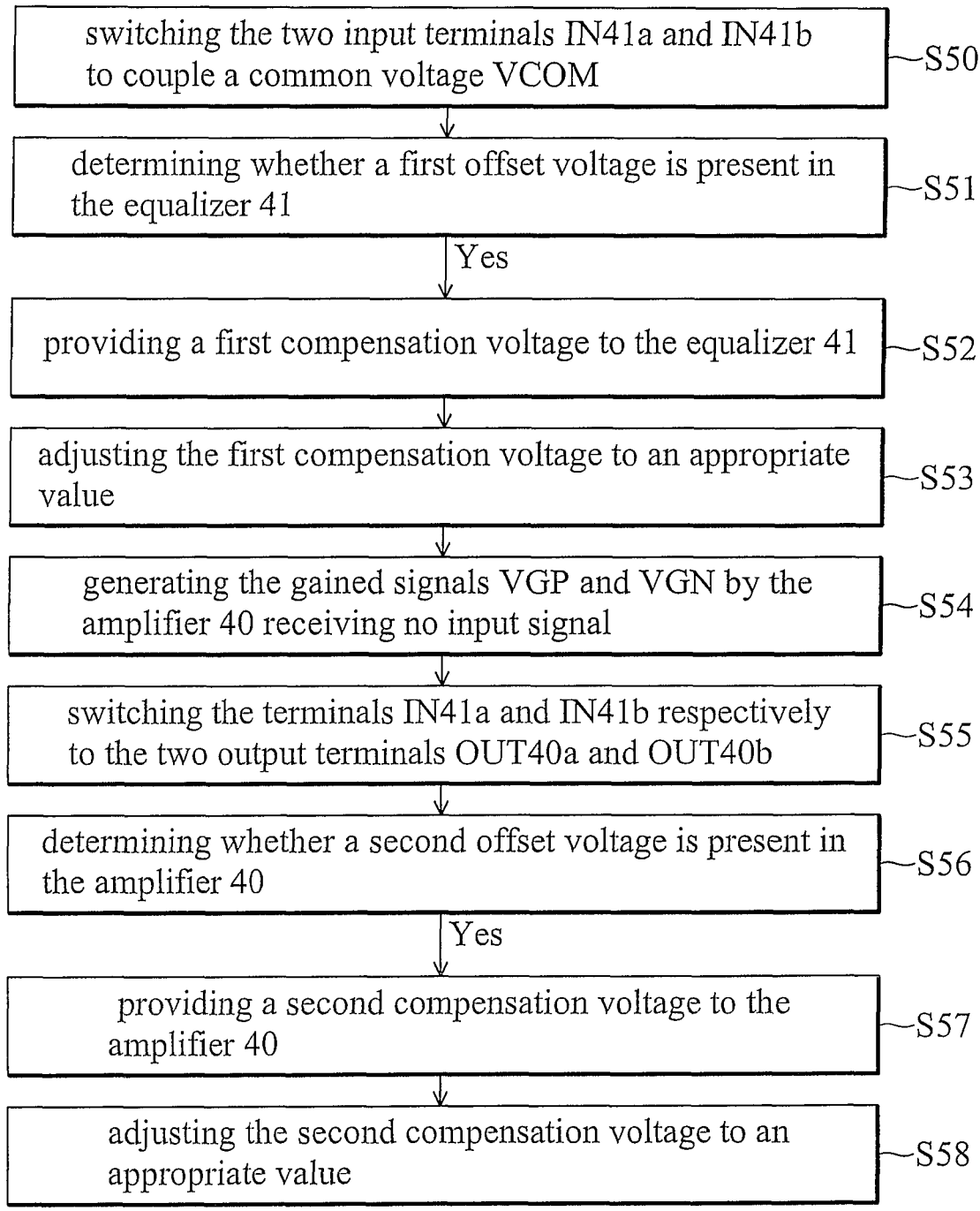
FIG. 5 is a flow chart of an exemplary embodiment of an offset calibration method for the RF data path circuit shown in FIG. 4.

FIG. 5 is a flow chart of an exemplary embodiment of an offset calibration method for the RF data-path circuit 4 shown in FIG. 4. Referring to FIGS. 4 and 5, in a first step of a calibration mode, at a first time point, the two input terminals IN41a and IN41b of the equalizer 41 are switched to couple a voltage level, e.g. a common voltage VCOM (step S50). In order words, the signals which are inputted into the two input terminals IN41a and IN41b of the equalizer 41 are set to be equal. The equalizer 41 generates the equalized signals VADP and VADN according to the common voltage VCOM. The determination unit 45 determines whether a first offset voltage is present in the equalizer 41 according to the equalized signals VADP and VADN generated from the common voltage VCOM (step S51). The offset calibration unit 43 provides a first compensation voltage to the equalizer 41 if the first offset voltage is determined to be present in the equalizer 41 (step S52).

In the first step of this embodiment, the determination unit 45 determines whether a first offset voltage is present in the equalizer 41 by determining whether levels of the equalized signals VADP and VADN of the first time point are close to each other or even substantially equal to each other. If the levels of the equalized signals VADP and VADN of the first time point are not close to each other, the determination unit 45 determines that a first offset voltage is present in the equalizer 41. When providing the first compensation voltage to the equalizer 41, the offset calibration unit 43 also adjusts the first compensation voltage to an appropriate value until the levels of the equalized signals VADP and VADN are close to each other (step S53). Therefore, the first offset voltage present in the equalizer 41 is finally compensated. A detailed description of the determination operation of the first offset voltage is provided in the following.

Figure 6:
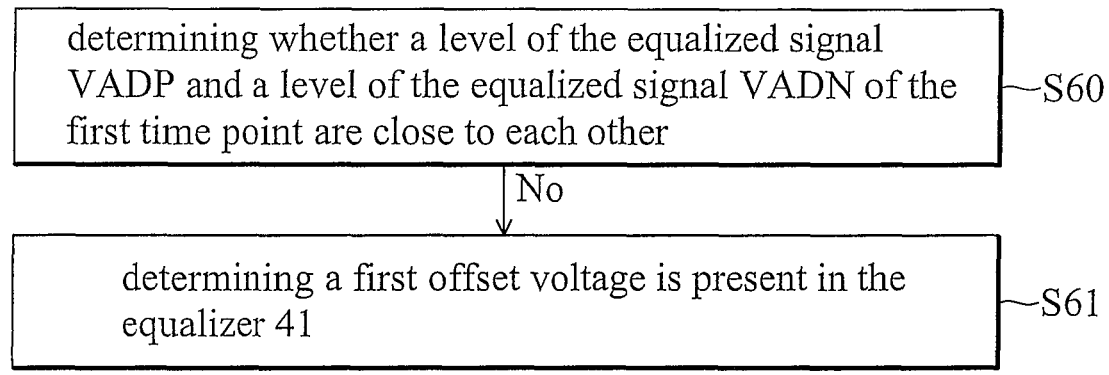
FIG. 6 is a flow chart of an exemplary embodiment of the determination operation of the first offset in the equalizer in FIG. 4.

In some embodiments, as shown in FIG. 6, the determination unit 45 can receive the equalized signals VADP and VADN outputted from the two output terminals OUT41a and OUT41b of the equalizer 41 and directly determine whether a level of the equalized signal VADP and a level of the equalized signal VADN of the first time point are close to each other (step S60). If the levels of the equalized signals VADP and VADN of the first time point are not close to each other, the determination unit 45 determines that a first offset voltage is present in the equalizer 41 (step S61).

Figure 7:
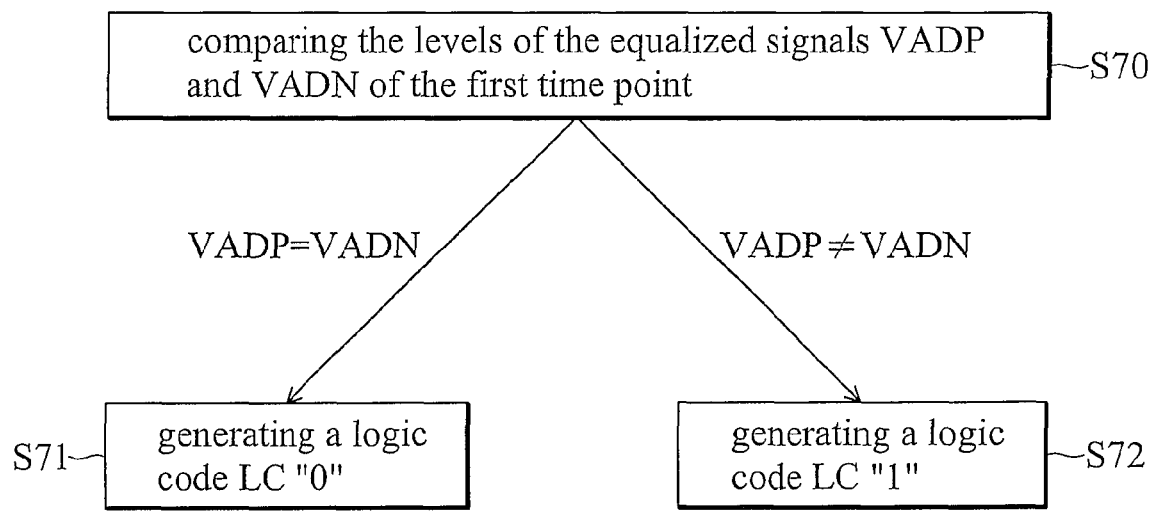
FIG. 7 is a flow chart of another exemplary embodiment of the determination operation of the first offset voltage in the equalizer in FIG. 4.

In other some embodiments, as shown in FIG. 7, the ADC 42 can be used to compare the levels of the equalized signals VADP and VADN of the first time point to determine whether the equalized signals VADP and VADN of the first time point are close to each other (step S70), that is, by generating a logic code LC according to the compared result. When the levels of the equalized signals VADP and VADN of the first time point are close to each other, the ADC 42 generates a logic code LC "0" (step S71). For example, the levels of the equalized signals VADP and VADN may be defined to close to each other according to the transient of the logic code LC, such as from "1" to "0" or even from "1" to "−1". When the levels of the equalized signals VADP and VADN of the first time point are not close to each other, the ADC 42 does not generate a logic code LC "0" (step S72), and instead, the ADC 42 may generate a logic code such as LC "1". The determination unit 45 receives the logic code LC from the ADC 42 and determines there is a first offset voltage in the equalizer 41 according to the logic code "1".

Referring to FIGS. 4 and 5, in a second step following the first step as stated above in the embodiment, the amplifier 40 stops receiving the input signal RFIP (that is the amplifier 40 receives no input signal) and accordingly generates the gained signals VGP and VGN (step S54). At a second time point later than the first time point, the two terminals IN41a and IN41b of the equalizer 41 are switched to the two output terminals OUT40a and OUT40b to couple to the gained signals VGP and VGN, respectively (step S55). The equalizer 41 generates the equalized signals VADP and VADN according to the gained signals VGP and VGN. The determination unit 45 determines whether there is a second offset voltage in the amplifier 40 according to the equalized signals VADP and VADN generated from the of the gained signals VGP and VGN (step S56). The offset calibration unit 44 provides a second compensation voltage to the amplifier 40 if a second offset voltage is determined to be present in the amplifier 40 (step S57). In some embodiments, the offset calibration units 43 and 44 and the determination unit 45 can be implemented by one device, such as a micro-processor, which can perform the offset calibration operation of the offset calibration units 43 and 44 and the determination operation of the determination unit 45. Alternatively, the offset calibration units 43 and 44 and the determination unit 45 can be implemented by separate devices for performing the two steps of the offset calibration operation, respectively.

In the second step of this embodiment, the determination unit 45 determines whether a second offset voltage is present in the amplifier 40 by determining whether the levels of the equalized signals VADP and VADN of the second time point are close to each other. If the levels of equalized signals VADP and VADN of the second time point are not close to each other, the determination unit 45 determines that a second offset voltage is present in the amplifier 40. When providing the second compensation voltage to the amplifier 40, the offset calibration unit 44 also adjusts the second compensation voltage to an appropriate value until the levels of the equalized signals VADP and VADN are close to each other (step S58). A detailed description of the determination operation of the second offset voltage is provided in the following.

Figure 8:
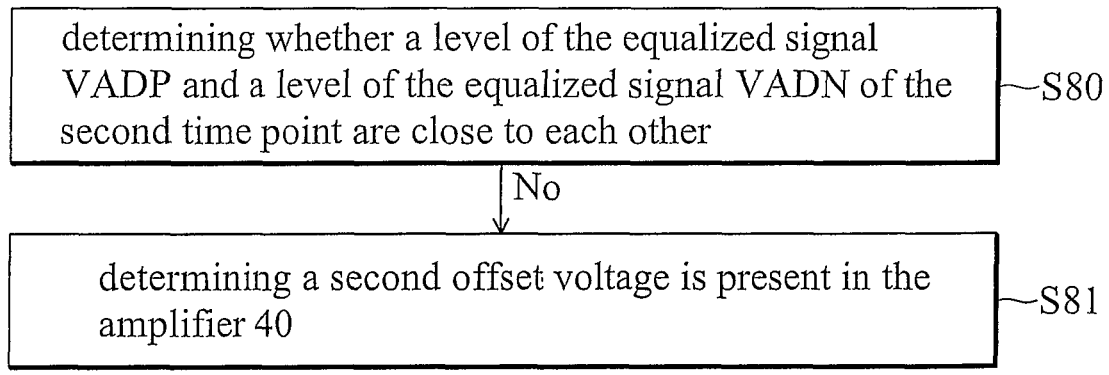
FIG. 8 is a flow chart of an exemplary embodiment of the determination operation of the second offset voltage in the amplifier in FIG. 4.

In some embodiments, as shown in FIG. 8, the determination unit 45 can receive the equalized signals VADP and VADN outputted from the two output terminals OUT41a and OUT41b of the equalizer 41 and directly determine whether a level of the equalized signal VADP and a level of the equalized signal VADN of the second time point are close to each other (step S80). If the levels of the equalized signals VADP and VADN of the second time point are close to each other, the determination unit 45 determines that a second offset voltage is present in the amplifier 40 (step S81).

Figure 9:
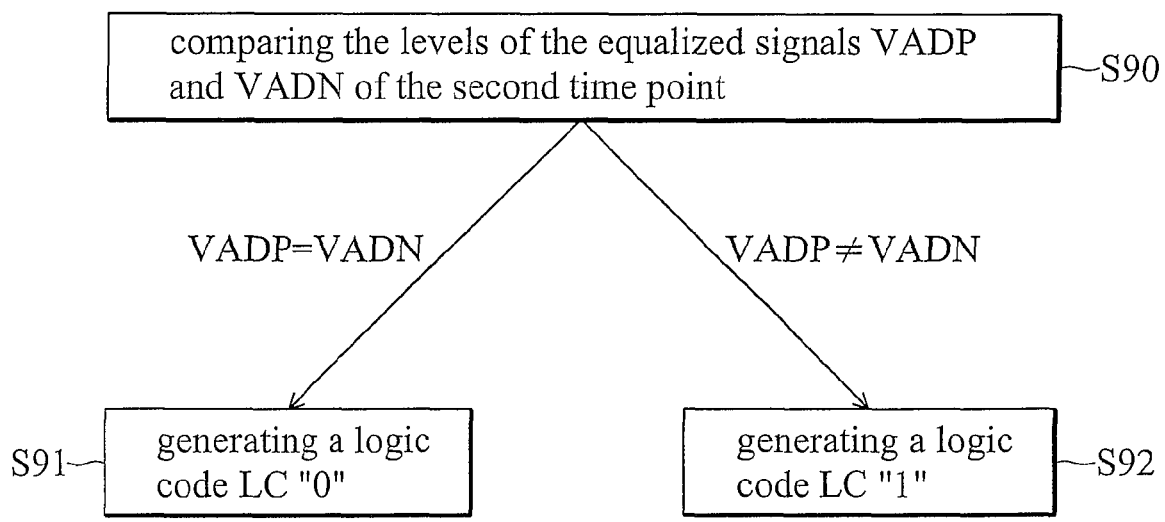
FIG. 9 is a flow chart of another exemplary embodiment of the determination operation of the second offset voltage in amplifier in FIG. 4.

In other some embodiments, shown in FIG. 9, the ADC 42 can be used to compare the levels of the equalized signals VADP and VADN of the second time point to determine whether the equalized signals VADP and VADN of the second time point are close to each other (step S90), that is, by generating a logic code LC according to the compared result. When the levels of the equalized signals VADP and VADN of the second time point are close to each other, the ADC 42 generates a logic code LC "0" (step S91). When the levels of the equalized signals VADP and VADN of the second time point are not close to each other, the ADC 42 does not generate a logic code LC "0" (step S92), and instead, the ADC 42 generates a logic code such as LC "1". The determination unit 45 receives the logic code LC from the ADC 42 and determines a second offset voltage is present in the amplifier 40 according to the logic code "1".

According to the described embodiments, in the first step of the calibration mode, after the offset calibration unit 43 adjusts the first compensation voltage to an appropriate value, the first compensation voltage is fixed, and the offset voltage compensation of the equalizer 41 is accomplished. If there is still an offset voltage present in the RF data path circuit 4 in a normal mode, the operation of the RF data path circuit 4 can selectively perform the second step of the calibration mode to compensate the offset voltage of the amplifier 40, thereby eliminating the offset voltage in the RF data path circuit 4 and enhancing data reading quality.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An offset calibration method comprising:
    switching two input terminals of an equalizer to a common voltage at a first time point, wherein the equalizer generates a first equalized signal and a second equalized signal according to the common voltage;
    determining whether a first offset voltage is present in the equalizer according to the first and second equalized signals generated from the common voltage; and
    providing a first compensation voltage to the equalizer if the first offset voltage is determined to be present in the equalizer.

2. The offset calibration method as claimed in claim 1, wherein the step of determining whether the first offset voltage is present in the equalizer comprises:
    determining whether levels of the first and second equalized signals of the first time point are substantially equal to each other, wherein the first offset voltage is determined to be present in the equalizer if the levels of the first and second equalized signals of the first time point are not substantially equal to each other.

3. The offset calibration method as claimed in claim 2 further comprising adjusting the first compensation voltage until the levels of the first and second equalized signals are substantially equal to each other.

4. The offset calibration method as claimed in claim 2, wherein the step of determining whether the levels of the first and second equalized signals of the first time point are substantially equal to each other comprises:
    comparing the first and second equalized signals of the first time point; and
    generating a logic code according to a compared result, wherein the logic code is not "0" when the levels of the first and second equalized signals of the first time point are not substantially equal to each other.

5. The offset calibration method as claimed in claim 1 further comprising:
    switching the two input terminals of the equalizer respectively to a first gained signal and a second gained signal at a second time point, wherein the first and second gained signals are generated by an amplifier;
    determining whether a second offset voltage is present in the amplifier according to the first and second equalized signals of the second time point; and
    providing a second compensation voltage to the amplifier if the second offset voltage is determined to be present in the amplifier.

6. The offset calibration method as claimed in claim 5, wherein the second time point is later than the first time point, and the first and second gained signals are generated by the amplifier receiving no input signal.

7. The offset calibration method as claimed in claim 5, wherein the step of determining whether the second offset voltage is present in the amplifier comprises:
    determining whether levels of the first and second equalized signals of the second time point are substantially equal to each other, wherein the second offset voltage is determined to be present in the amplifier if the levels of the first and second equalized signals of the second time point are not substantially equal to each other.

8. The offset calibration method as claimed in claim 7 further comprising adjusting the second compensation voltage until the levels of the first and second equalized signals are substantially equal to each other.

9. The offset calibration method as claimed in claim 7, wherein the step of determining whether levels of the first and second equalized signals of the second time point are substantially equal to each other comprises:
    comparing the first and second equalized signals of the second time point; and
    generating a logic code according to a compared result, wherein the logic code is not "0" when the levels of the first and second equalized signals of the second time point are not substantially equal to each other.

10. A radio frequency (RF) data path circuit comprising:
    an equalizer comprising two input terminals, for generating a first equalized signal and a second equalized signal, wherein at a first time point, the two input terminals of the equalizer are switched to couple a common voltage;
    a determination unit, for determining whether a first offset voltage is present in the equalizer according to the first and second equalized signals of the first time point generated from the common voltage; and
    a first offset calibration unit, coupled to the equalizer, for providing a first compensation voltage to the equalizer if the first offset voltage is determined to be present in the equalizer.

11. The RF data path circuit as claimed in claim 10, wherein the determination unit is arranged to determine whether levels of the first and second equalized signals of the first time point are substantially equal to each other, and determine the first offset voltage is determined to be present in the equalizer if the levels of the first and second equalized signals of the first time point are not substantially equal to each other.

12. The RF data path circuit as claimed in claim 11, wherein the first offset calibration unit is arranged to adjust the first compensation voltage until the levels of the first and second equalized signals are substantially equal to each other.

13. The RF data path circuit as claimed in claim 11 further comprising an analog-to-digital converter for generating a logic code according to the first and second equalized signals of the first time point, wherein the logic code is not "0" when the levels of the first and second equalized signals of the first time point are not substantially equal to each other.

14. The RF data path circuit as claimed in claim 10 further comprising:
    an amplifier for generating a first gained signal and a second gained signal, wherein at a second time point, the two input terminals of the equalizer are respectively switched to the first and second gained signals, and the determination unit is arranged to determine whether a second offset voltage is present in the amplifier according to the first and second equalized signals of the second time point; and
    a second offset calibration unit, coupled to the amplifier, for providing a second compensation voltage to the amplifier if the second offset voltage is determined to be present in the amplifier.

15. The RF data path circuit as claimed in claim 14, wherein the second time point is later than the first time point, and the first and second gained signals are generated by the amplifier receiving no input signal.

16. The RF data path circuit as claimed in claim 14, wherein the determination unit is arranged to determine whether levels of the first and second equalized signals of the second time point are substantially equal to each other, and determines that the second offset voltage is present in the amplifier if the levels of the first and second equalized signals of the second time point are not substantially equal to each other.

17. The RF data path circuit as claimed in claim 14, wherein the second offset calibration unit is arranged to adjust the second compensation voltage until levels of the first and second equalized signals are substantially equal to each other.

18. The RF data path circuit as claimed in claim 14 further comprising an analog-to-digital converter for generating a logic code according to the first and second equalized signals of the second time point, wherein the logic code is not "0" when levels of the first and second equalized signals of the second time point are not substantially equal to each other.

* * * * *